United States Patent Office 2,806,787
Patented Sept. 17, 1957

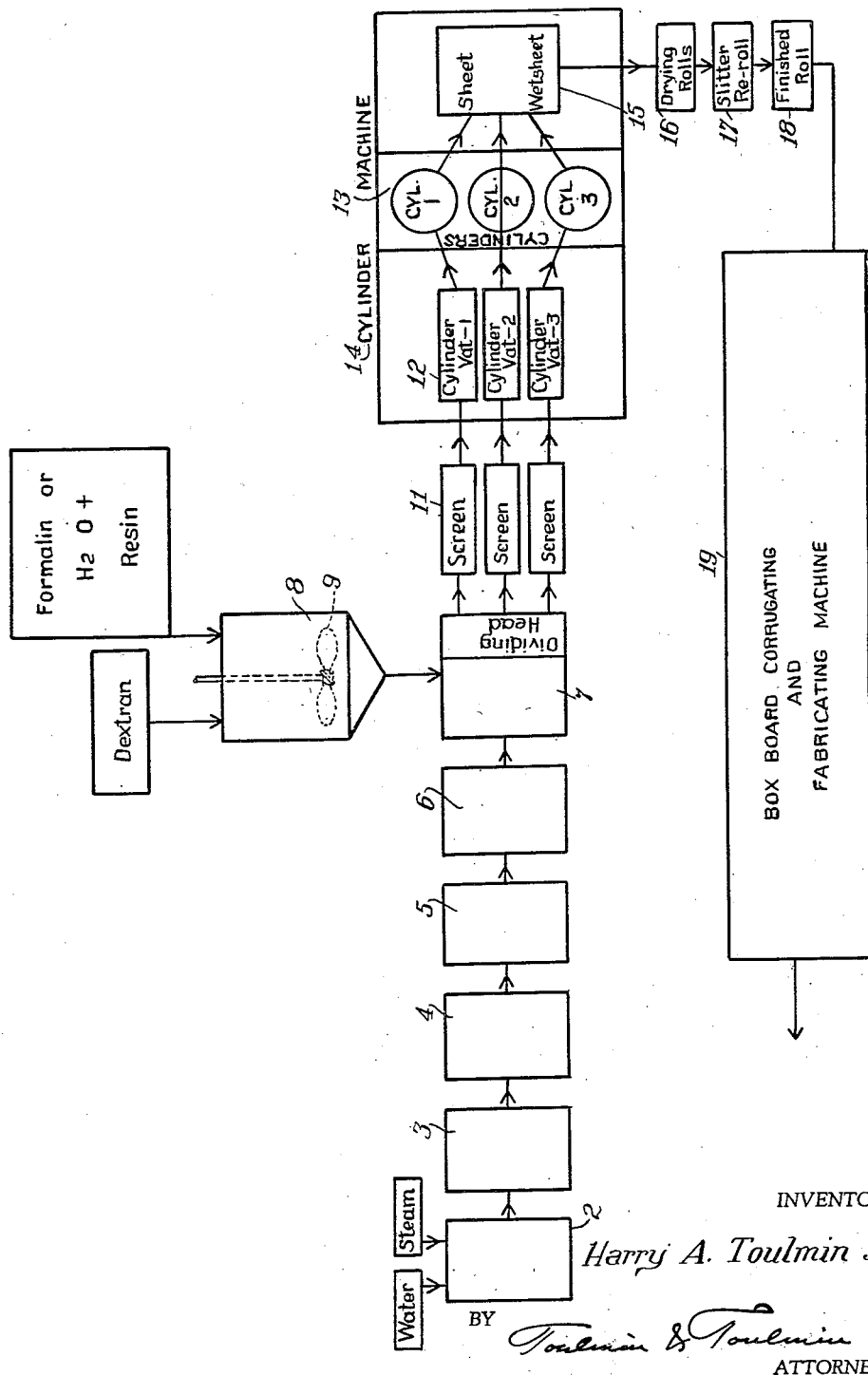

2,806,787

METHOD OF MAKING CORRUGATED PAPER PRODUCTS UTILIZING A DEXTRAN-FORMALDEHYDE REACTION PRODUCT

Harry A. Toulmin, Jr., Dayton, Ohio, assignor to The Commonwealth Engineering Company of Ohio, Dayton, Ohio, a corporation of Ohio Application November 6, 1953, Serial No. 390,714

4 Claims. (Cl. 92—21)

This invention relates to an improvement in corrugated paper products such as boxboard. More particularly, the invention relates to boxboard having high wet and dry strengths and good resistance to crushing.

Various resins have been proposed for incorporation in the fiber stock with the objective of improving the properties, including strength and durability, of corrugated paper products of the boxboard type. Usually, the resin used is a thermosetting resin which is mixed and sheeted with the stock in the thermoplastic or water-soluble condition and then thermoset by heat on the sheets. In many cases it is found that the resins, after curing thereof, tend to embrittle the product to the extent that it does not have strength and flexibility enough to permit use thereof as a protective wrapper or as filling in shipping containers and the like.

One object of this invention is to provide a new method of making corrugated paper products or sheets which results in products having very good wet and dry strengths and crush resistance without embrittlement of the fibers forming the base of the sheet or corrugated product.

Another object is to produce corrugated paper products which have good strength coupled with sufficient toughness to permit of their being bent or rolled without cracking or separation of the corrugations.

These and other objects are accomplished in accordance with this invention by means of a dextran-formaldehyde, or dextran-formaldehyde resin, complex formed in part in situ on the sheeted stock at a pH of 1.0 to 6.0, preferably, particularly in the case of dextran-formaldehyde complexes, at pH 1.2 to 2.5, most desirably 1.2 to 1.5.

These dextrans may be obtained by various methods. They may be synthesized from sucrose by enzyme action in the presence or substantial absence of bacteria. For example, an aqueous nutrient medium containing sucrose, particular nitrogenous compounds and certain inorganic salts, may be inoculated with a culture of an appropriate microorganism such as those of the *Leuconostoc mesenteroides* and *L. dextranicum* types, and incubated at the temperature most favorable to the growth of the microorganism until maximum dextran production is attained. This is synthesis of the dextran from sucrose by the so-called "whole culture" method, i. e., the synthesis is effected by enzyme action in the presence of the bacteria and cellular debris. Or the culture obtained by cultivating the Leuconostoc bacterium may be filtered to isolate the enzyme (dextransucrase) which occurs in the filtrate, the filtrate, usually after dilution to predetermined enzyme potency, may be mixed with an aqueous sucrose solution, and the mixture may be allowed to stand under controlled conditions of pH and temperature until the dextran is synthesized. The enzyme may be separated from the filtrate and used in powdered condition or in the form of an aqueous solution, usually the latter. This is dextran synthesis by enzyme action in the substantial absence of bacteria and cellular debris.

The dextran obtained initially by these procedures normally has a very high average molecular weight, calculated to be in the millions. It may be precipitated from the medium in which it is synthesized by the addition of an organic liquid which is a non-solvent for the dextran. The non-solvent, or precipitant, may be a water-miscible aliphatic alcohol, e. g., methanol, ethanol or isopropanol, or a ketone such as acetone or dioxane. The precipitated dextran may be purified and dried to a substantially white mass which may be reduced to powdered condition for reaction with the aldehyde or resin.

Instead of using the dextran in its native or high molecular weight state, it may be hydrolyzed by acid or enzyme action to a molecular weight in the medium to lower area of the range stated herein. So-called "clinical" dextran having an average molecular weight of from 20,000 to 200,000 may be used.

In "clinical" dextran production, when the desired molecular weight is obtained by hydrolysis or cleavage of the native material, it is usual to isolate the "clinical" product from the hydrolyzate by fractional precipitation according to which, by successive addition of increasing amounts of water-miscible alcohol or ketone, the highest molecular weight fraction is first thrown down and separated, and the desired or intermediate molecular fraction is then precipitated and recovered. This procedure leaves a supernatant containing dextran the average molecular weight of which is below the "clinical" range, and the supernatant is usually discarded as waste.

According to this invention, the low molecular weight (generally about 5000 to 50,000) residual dextran may be recovered from the supernatant for use in the present reaction and, in some instances, may be preferred for such use. The different dextran fractions may also be isolated from the hydrolyzate by fractional solution methods involving the use of the precipitant in conjunction with a dextran solvent, usually water. It may be noted, here, that when the dextran syntheis is effected by the action of the enzyme on sucrose in the absence of bacteria, it is possible to carry out the synthesis under conditions such as to favor the production of dextran of relatively low molecular weight in at least preponderant proportion. It is possible, therefore, as is now known, to obtain relatively low average molecular weight dextran directly and the dextran used to form the stiffening and strengthening complex may be so obtained.

In proceeding in accordance with the preferred embodiment of the invention, dextran or a partial conversion product thereof, such as a carboxyalkyl or hydroxyalkyl ether having an average of at least some free hydroxyl groups, is premixed and preheated with formaldehyde (used as a 40% aqueous formalin solution) under controlled conditions resulting in the formation of a water-soluble or water-dispersible partial complex or condensate of the dextran or dextran conversion product and the formaldehyde. This preheating, preferably takes place at pH 4.0 to 6.5 and at moderate temperatures of about 50–70° C., for from 20 minutes to one hour. The partial reaction product is then mixed with the paper making stock in the head box in an amount of from 2% to 10% based on the fiber weight. The stock is then diluted to final desired concentration and an acid or acid liberating salt is added to adjust the pH to 1.2 to 2.5, preferably 1.2 to 1.5, the mass is sheeted, the desired number of sheets are stacked, and the stacked sheets are corrugated. The concentration of the partial reaction product in the final diluted stock is preferably from 0.1 to 5% on the fiber weight.

These last-mentioned operations, with the exception of the corrugating step, are performed at controlled relatively low temperature just sufficient to dry the sheets and permit handling thereof while avoiding volatilization of any unreacted formaldehyde and inhibiting premature completion of the chemical reaction. The corrugating is then performed at elevated or baking temperature such that, during the corrugating, the reaction of the formaldehyde with the cellulose of the paper making fibers, and probably further reaction with the dextran, is completed, with the formation of acetal type bridges between the cellulose (and dextran) chains and insolubilization of the complex on the fibers.

The drying may take place at 50–70° C. The temperature in the corrugating zone may be between 100 and 200° C. and preferably is correlated with the length of the corrugating zone so that the chemical reaction or reactions is (are) not completed until the corrugated product is ready to leave the corrugating zone. The temperature prevailing in the corrugating zone may increase progressively from, say, 100° C. to 200° C. in the direction of the exit end thereof, or the temperature and the time of passage through the zone may be correlated so that the temperature varies inversely with the time, shorter passage times requiring the higher temperatures and vice versa.

Instead of formaldehyde, other aldehyde or aldehyde-yielding substances may be used, or one may replace the formaldehyde with the di-aldehyde, glyoxal. Formaldehyde and glyoxal are preferred.

In another embodiment of the invention, the dextran is used in combination with a water-soluble urea-, phenol-, or melamine-formaldehyde resin. The dextran and water-soluble resin are pre-mixed, in aqueous solution, with heating, to obtain a partial reaction product which is convertible, on further heating during corrugating of the laminated paper sheets, to thermoset condition. The partial reaction may be effected under mildly acidic conditions, i. e., at pH 4.0 to 6.5 at a temperature of 75° C. to 85° C. for about 20 minutes to one hour. The amount of the water-soluble or water-dispersible partial reaction product thus obtained, which is distributed in the stock, is preferably from about 2% to 10% on the fiber weight, and after final dilution of the stock immediately prior to sheeting thereof is preferably between about 0.1% to 5% on the fiber weight.

The dextran derivatives which may be reacted with either formaldehyde, glyoxal, or the initially water-soluble resin include the ethers, which may be simple alkyl ethers, hydroxyalkyl ethers, carboxyalkyl ethers, mixed alkyl-hydroxyalkyl ethers, mixed alkyl-carboxyalkyl ethers, and salts of the carboxyalkyl ethers. These ethers may have a D. S. (degree of substitution or ratio of ether groups to anhydroglucopyranosidic units) such that they contain an average of at least 1.0 hydroxyl group per anhydroglucopyranosidic unit. The D. S. may be from less than 1.0:1 to about 2:1. In general, the ethers may be obtained by reacting the dextran with the selected etherifying agent in the presence of a strongly alkaline catalyst such as a strong alkali metal hydroxide, i. e., sodium, potassium, or lithium hydroxide.

Suitable etherifying agents for dextran include: dimethyl sulfate, di-ethyl sulfate, methyl sodium sulfate and the like; alkyl halides, e. g., methyl chloride, ethyl chloride, methyl bromide, ethyl bromide, and the like; benzyl chloride; hydroxy-alkylating agents as alkylene oxides such as ethylene oxide, propylene oxide, glycides, and the like; halohydrins, including ethylene chlorhydrin, propylene chlorhydrin, glycerine chlorhydrin, epichlorhydrin, etc.; carboxy alkylating agents such as chloracetic acid, chloropropionic acid, sodium chloracetate, chloracetamide and the like.

Particularly suitable are the partial ethers, carboxymethyl dextran, carboxyethyl dextran, and hydroxyethyl dextran.

The acid or acid liberating salts which may be used to adjust the modified diluted stock to the desired pH include sulfuric acid, hydrochloric acid, oxalic acid, ammonium chloride, ammonium sulfate, ammonium nitrate, and sodium bisulfate. Sulfuric acid is the presently preferred catalyst. The catalyst used in the preliminary reaction of the ingredients to obtain the partial reaction product to be added to the stock is preferably the same as that used in adjusting the pH of the final stock.

The pH at which the stock is sheeted and processed to the corrugated product may be somewhat higher (4.0–6.5) when the dextran is reacted with a water-soluble resin, than is desirable and preferred (1.2–2.5) when formaldehyde or glyoxal is reacted with the dextran or dextran ether. This last-mentioned pH is such that the stock is, of course, strongly acid. However the strongly acid condition is preferred for optimum results and, in order to avoid embrittlement of the cellulose fibers under the strongly acid conditions, it may be found desirable to further modify the stock before sheeting thereof by the inclusion of a water-soluble buffering salt. Sodium sulfate or potassium sulfate are the preferred buffers and may be used in an amount of 0.1 to 2.0% on the weight of the fibers.

The invention is illustrated and also specifically exemplified in the following description of the attached drawing which is a diagrammatic showing of apparatus used in making the boxboard or corrugated sheeting.

In the drawing, there is shown a digester 2 into which the fibers (e. g., wheat, soya or oat straws, particularly wheat straw) and suitable (conventional) chemicals are introduced, together with water and steam. The digested stock proceeds to the multiple beaters (one being shown at 3), from which it passes to the beaters chest 4 for storage, hence to the Jordans 5, and thence into the machine chest 6 in which it is slowly agitated before it is delivered to the headbox 7.

Mounted above the headbox is a vessel 8 having a cone-shaped bottom and into which the particulate dextran, e. g., *Leuconostoc mesenteroides* B–512 native dextran, and 40% aqueous formalin are introduced. Vessel 8 is equipped with a stirrer 9. There may be used, for example, 50 to 125 parts of 40% formalin solution or 30% glyoxal solution and 50 to 100 parts of dextran, by weight.

In vessel 9, the reactants are heated at 50–70° C. by means of an external source of heat (not shown) from 20–45 minutes to effect partial reaction therebetween. This product, which becomes dispersed in the water in the form of comparatively fine discrete particles, is metered to the stock in headbox 7, a sufficient amount of the solution being metered to introduce from 2% to 10% by weight of the partial reaction product into the stock. The mixture is then forwarded to the dividing head 10, in which the stock is diluted to final concentration by the addition of water to a concentration of 0.1% to 2.0% of the partial reaction product and sufficient sulfuric acid (5–15 parts of 95% $H_2SO_4$) is added to adjust the pH to 1.2 to 2.5, preferably 1.2 to 1.5.

The fibrous mass is then laid down on the screen 11. The partial reaction product is adhesive, due to the pronounced adhesiveness of the dextran in the presence of water, at least some of which is retained by the reaction product, and thus the fibers on the screen are impregnated or coated with the partial reaction product. It should be noted that under the preferred conditions of preheating, the reaction proceeds only to the extent that the formaldehyde is bound to the dextran and is not lost to any appreciable extent by volatilization or by entrainment in the water passing through the screen.

From the screens, the fibers pass to the cylinder vats 12 with their cylinders 13 shown under the general designation "cylinder machine" 14. (In practice the cylinder is mounted in the vat, as will be understood.) From this point, the stock delivered by the several cylinders is laminated to provide a 3-ply sheet which passes out as wet sheet at 15 to the drying rolls 16, slitter re-roll 17, and finish roll 18. The temperature at the wet end of the machine and the drier temperatures are controlled so that the reaction of the dextran and formaldehyde is not forced to completion at those stages of the handling, but may proceed at a slow rate. It is difficult to state precisely the exact temperatures which should be used at these early stages of the method because of the differences in the various paper making machines and in the time periods involved. These temperatures can be determined empirically and are such that the sheets are dried and laminated sufficiently for easy handling but the formaldehyde and dextran or dextran conversion product are not completely reacted. Temperatures of 50° C.–70° C. are preferred and if these are not sufficient to dry the sheets in the time available other expedients may be resorted to, such as re-passage of the sheets through the drying rolls or subjecting the sheets to warm air currents after they leave the drying rolls.

The reaction between the dextran or dextran conversion product and the formaldehyde is then completed on the boxboard, corrugating and fabricating machine indicated at 19, in which the temperature is between 100° C. and 200° C. and preferably about 150° C. when the speed of travel of the laminate through the heated zone is such that each succeeding portion of the laminate is exposed to the temperature of 150° C. for about one-half minute, with the formation of an insolubilized, cross-linked complex which functions to stiffen and strengthen the product and render the same resistant to moisture. One or both sides of the corrugated sheet is then treated with a liquid adhesive and a liner sheet is applied to one or both sides thereof, depending on the type of boxboard being produced. This completes the production of the boxboard.

As a further specific improvement, the adhesive applied to the corrugated sheet for bonding of the liner sheet to it, is preferably an aqueous dispersion of a difficultly water-soluble to substantially water-insoluble high molecular weight dextran such as native *Leuconostoc mesenteroides* B–523 dextran. The adhesive may be an aqueous composition containing by weight from 0.5% to 50% of the dextran, and is preferably such as to have sufficient viscosity to prevent running of the solution when it is applied to the corrugated product. The adhesive may be advantageously coated on the surface of the corrugated sheets and on the surface of the liner sheet to be contacted by the corrugated laminate.

In the foregoing specific example described in conjunction with the drawing, the adhesive applied to the corrugated product is a composition consisting essentially of 65% of water and 35% of dextran by weight. Lower proportions of the dextran may be used. The composition may contain dextran obtained by precipitating native dextran from a medium in which the dextran is synthesized from sucrose by the action of the enzyme from *Leuconostoc mesenteroides* B–523, in the presence or substantial absence of bacteria and cellular debris, using a water-miscible aliphatic alcohol as the precipitant, and then volatilizing alcohol from the precipitated material.

After application of the adhesive coating, and deposition of the liner sheet on the corrugated sheet, the product is heated at moderate temperature to dry and set the adhesive. The conventional device used to supply adhesive to corrugated sheets may be used to apply the dextran adhesive to it. The dextran in the adhesive composition is compatible with the dextran formaldehyde or dextran-resin complex fixed on the corrugated sheet to provide an exceptionally strong bond between the liner sheet and the corrugated sheet.

Other dextrans which are resistant to dissolution in water, but can be dispersed in water under heating such as those obtained using the microorganisms (or their enzymes) bearing the NRRL (Northern Regional Laboratory) designations: *L. m.* B–742, B–1191, B–1196, B–1208, B–1216, B–1120, and B–1144; *Streptobacterium dextranicum* B–1254 and *Betabacterium vermiforme* B–1129 may be used as the adhesive binder.

It should be emphasized that the best operating conditions may vary considerably with the machine used. However, the details given herein will be instructive to those skilled in the art and assist in adaptation of this method to the different types of machines in general use. Basically, the invention resides in a boxboard or stiffened and strengthened corrugated paper product resistant to moisture and carrying a fully reacted, insolubilized stiffening and strengthening complex of dextran-formaldehyde- and cellulose or of dextran-formaldehyde resin- and cellulose, obtained by mixing the partial reaction product of dextran and formaldehyde (or glyoxal), or of dextran and the formaldehyde resin with the paper making stock and processing the stock to boxboard or the like under correlated conditions of time and temperature such that chemical reaction of the complex with the fibers takes place at controlled rate and is completed in the corrugating machine as or immediately after the product leaves the corrugating zone. Preferably, the conditions are controlled so that the chemical reaction is not completed until immediately after the product leaves the corrugating zone. This insures that the laminate remains sufficiently flexible to form readily into corrugations, without cracking or breaking, when it passes over the corrugating rolls.

When glyoxal or the water-soluble resins are used with the dextrans they may be used in the same or equivalent amounts as the formaldehyde, and give approximately the same results. In such modifications, the details given in the specific example may be followed, except that, in the case of the resins, the reaction may be completed, if desired, at pH 4.0–6.5.

Since, although specific details have been given to illustrate the invention, these may be varied in actual practice within the scope of the disclosure, it is to be understood that it is not intended to limit the invention except as defined in the present claims.

I claim:

1. The method of making corrugated paper products which comprises incorporating with paper-making stock comprising cellulose fibers a water-dispersible partial reaction product of formaldehyde with a substance selected from the group consisting of water-soluble, native, microbiologically produced dextran, carboxymethyl ethers of said dextran containing an average of 1.0 to 2.0 carboxymethyl groups per anhydroglucose unit of the dextran, and carboxyethyl ethers of said dextran containing an average of 1.0 to 2.0 carboxyethyl groups per anhydroglucose unit of the dextran, in an amount between 2% and 10% on the fiber weight, diluting the stock with water to a content of 0.1% to 5% of the partial reaction product, adding an acid to the diluted stock to adjust the pH thereof to 1.2 to 2.5, sheeting the stock, assembling a plurality of the sheets in superimposed relation, drying the assembled sheets, the sheeting, assembling and drying operations being carried out at a temperature of about 50° C. to 70° C. and without setting of the partial reaction product to completely reacted condition on the fibers, and then corrugating the sheets in a heated corrugating zone at a temperature which increases progressively from the entrance to the exit end of said zone and is correlated with the time required for the assembled sheets to pass through said zone so that the partial reaction product initially present in the stock is in completely reacted condition, insolubilized, and reacted with the cellulose fibers of the paper when the product leaves the corrugating zone but not before the corrugations are formed.

2. The method according to claim 1, characterized in that the product mixed with the paper-making stock is a partial reaction product of formaldehyde and native, water-soluble, unhydrolyzed dextran.

3. The method according to claim 1, characterized in that the product mixed with the paper-making stock is a partial reaction product of formaldehyde and a carboxymethyl ether of native, water-soluble, unhydrolyzed dextran containing an average of 1.0 to 2.0 carboxymethyl groups per anhydroglucose unit of the dextran.

4. The method according to claim 1, characterized in that the product mixed with the paper-making stock is a partial reaction product of formaldehyde and a carboxyethyl ether of native, water-soluble, unhydrolyzed dextran, containing an average of 1.0 to 2.0 carboxyethyl groups per anhydroglucose unit of the dextran.

References Cited in the file of this patent

UNITED STATES PATENTS

| | | |
|---|---|---|
| Re. 22,842 | Hill | Feb. 18, 1947 |
| 71,892 | Lowry | Dec. 10, 1867 |
| 620,756 | Duerden | Mar. 7, 1899 |
| 1,847,773 | Lionne | Mar. 1, 1932 |
| 2,130,838 | Brown | Sept. 20, 1938 |
| 2,143,911 | Fourness | Jan. 17, 1939 |
| 2,221,200 | Perry | Nov. 12, 1940 |
| 2,392,258 | Owen et al. | Jan. 1, 1946 |
| 2,600,845 | Carrigan | June 17, 1952 |
| 2,602,082 | Owen | July 1, 1952 |
| 2,670,663 | Wenzelberger et al. | Mar. 2, 1954 |
| 2,674,584 | Deniston | Apr. 6, 1954 |

OTHER REFERENCES

World's Paper Trade Review, Tech. Supp., June 27, 1941, pp. 49–56.